J. Burns.
Corn Planter

N° 63,851.   Patented Apr. 16, 1867.

Witnesses:
Frank Alden
J. Holmes

Inventor:
John Burns

United States Patent Office.

JOHN BURNS, OF ELYRIA, OHIO.

Letters Patent No. 63,851, dated April 16, 1867.

---

IMPROVEMENT IN CORN-PLANTERS.

---

The Schedule referred to in these Letters Patent and making part of the same.

---

TO ALL WHOM IT MAY CONCERN:

Be it known that I, JOHN BURNS, of Elyria, in the county of Lorain, and State of Ohio, have invented certain new and useful Improvements in Corn-Planters; and I do hereby declare that the following is a full and complete description thereof, reference being had to the accompanying drawings, making a part of this specification, in which—

Figure 1:
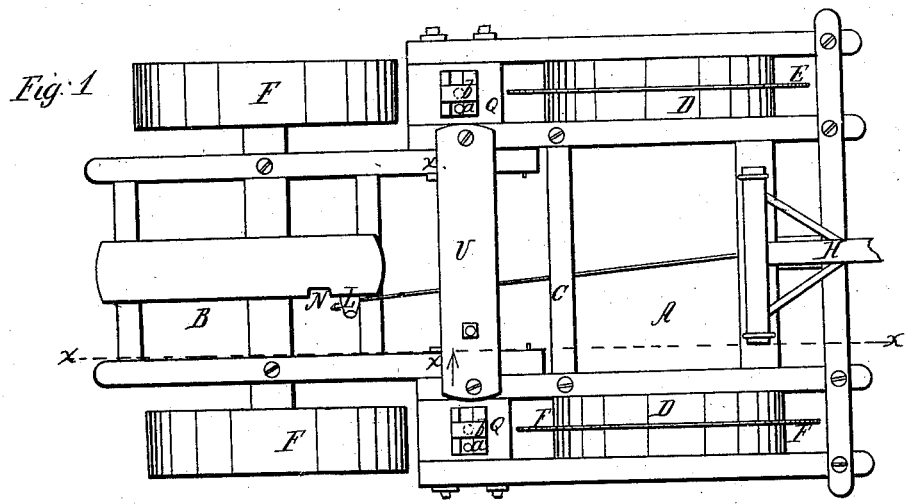
Figure 2:
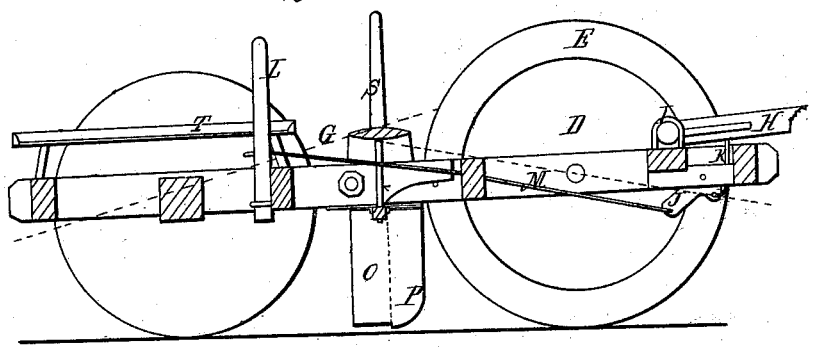
Figure 3:
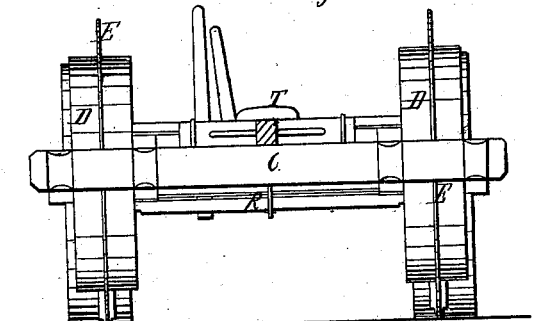

Figure 1 is a top view of the planter.
Figure 2 is a detached section.
Figure 3 is a front view.
Like letters of reference refer to like parts in the different views.

This planter is constructed in two sections, A B, fig. 1. In section A, C is a frame mounted upon the wheels D. These wheels are provided with a deep cutting blade, E, fig. 2, which is seen to project from the entire periphery of the wheel, the purpose of which will be hereafter shown. Section B also consists of a framework mounted upon a pair of wheels, F, and is connected to the frame C by an adjustable joint, at the point $x$, which allows the two sections to be raised upward at the point of connection, as indicated by the dotted lines G, fig. 2. H is the pole by which the machine is drawn, and is secured to the top of the frame by the stay-loops I. By the pole being attached to the frame in this way it is made to flex, and thereby relieving the pole and team from the weight of the machine. J, fig. 2, is a lever pivoted to the frame in the position indicated in the drawing. The short arm of this lever is attached to the pole by the link K, and the longer one to the upright lever L by the rod or link M. The purpose of this arrangement of levers and links is in order to make rigid the pole to the frame, which is done by pulling back the lever L into the notch N. This, it will be seen, draws upon the arm of the lever J, which in turn pulls down the pole to the frame and there secures it by the lever L, which is stayed in place by the notch referred to. O, fig. 2, is a conductor, the front of which is brought down to a thin, sharp edge, P, and which is arranged in a right line with the blade E, which it closely follows. The upper end of the conductor opens into a seeding or corn-box, Q, fig. 1, in the bottom of which plays a sliding valve, R, fig. 3. The end enclosed in the box is provided with two holes, $a$, one near the extremity, the other a little further in, directly under the cross-plate $b$, as indicated by the dotted lines. These holes are of sufficient capacity to hold four grains of corn. It will be evident that as the slide is moved in the direction of the arrows, the holes $a$, containing the seed, will be brought under the cross-piece to the hole in the conductor, down through which it drops to the ground, and so on, reversing the action of the slide, the same result is effected, viz, the dropping the corn through the conductor to the ground. The slide is operated by the lever S, fig. 2.

The practical operation of this machine is as follows: On being placed in the field, it is then started in the line of work, with the driver seated upon the stool T guiding the machine in its course, and a second person seated at U between the seeding boxes to drop the corn. As the planter moves forward the flanges or blades cut into the ground, severing all obstructions, as old stalks, grass, weeds, &c., and thus provides a clean, smooth rut, in which the conductor follows and drops the corn without being obstructed or clogged with grass, weeds, &c. It also serves to steady the machine from any lateral movement, so that the rows are straight when planted. The first two rows being planted, the machine is then turned around, first lifting the cutting blades out of the ground by raising the front of the machine, which the driver does by making the pole rigid in the manner as described, which throws the weight of the planter upon the pole and neck-yoke of the team. The driver at the same time takes his seat further back on the end of the stool, thus acting as a counterbalance. The fore wheels are thus raised up and the machine turned around upon the hind wheel into place for the about rows. The pole is then flexed, and the work of planting proceeds as before.

As above observed, the two sections are hinged together; this is for the purpose of gauging the depth of planting. The machine, as shown in fig. 2, is gauged to plant at the greatest depth required, but by flexing up the frame, as indicated by the dotted line, and securing it thus with pins provided for the purpose, the conductor is in consequence raised from the ground further, and hence the corn will not be planted so deep. Thus the planter can be easily adjusted to any required depth.

Of the advantages of this machine over many others the following are instanced: By the use of the revolving cutting blades referred to, the conductors cannot become clogged or obstructed, and therefore prevent the dropping of the grain from being irregular and uncertain. The blades cutting into the ground, the machine in consequence runs without any lateral displacement, hence the corn is always planted in uniform and straight rows.

What I claim as my improvement, and desire to secure by Letters Patent, is—

1. The wheels D, provided with the rotary cutting blades E, in combination with conductors O, and seed-boxes Q, when arranged and operated conjointly with the adjustable frames A B, as and for the purpose described.

2. The levers J L, and links M K, as arranged, in combination with the pole H, and adjustable frames A B, for the purpose and in the manner set forth.

JOHN BURNS.

Witnesses:
    J. H. BURRIDGE,
    E. E. WAITE.